US010215443B2

(12) United States Patent
Wolfe

(10) Patent No.: US 10,215,443 B2
(45) Date of Patent: Feb. 26, 2019

(54) AIR CONCENTRATOR/DIFFUSER PET ACCESSORY

(71) Applicant: Amy L Wolfe, Dacula, GA (US)

(72) Inventor: Amy L Wolfe, Dacula, GA (US)

( * ) Notice: Subject to any disclaimer, the term of this patent is extended or adjusted under 35 U.S.C. 154(b) by 499 days.

(21) Appl. No.: 14/814,483

(22) Filed: Jul. 30, 2015

(65) Prior Publication Data

US 2016/0061481 A1 Mar. 3, 2016

Related U.S. Application Data

(60) Provisional application No. 62/043,319, filed on Aug. 28, 2014.

(51) Int. Cl.
*F24F 13/08* (2006.01)
*F24F 11/30* (2018.01)
(Continued)

(52) U.S. Cl.
CPC .......... *F24F 13/082* (2013.01); *A01K 1/0353* (2013.01); *F24F 11/30* (2018.01); *F24F 11/56* (2018.01); *F24F 2120/10* (2018.01)

(58) Field of Classification Search
CPC .................. F24F 13/082; F24F 11/0034; F24F 2011/0068; A01K 1/0353
See application file for complete search history.

(56) References Cited

U.S. PATENT DOCUMENTS 3,065,685 A * 11/1962 Sylvester .............. F24F 13/075
454/316

6,516,749 B1 * 2/2003 Salasidis ............... A61B 5/1118
119/421

(Continued)

FOREIGN PATENT DOCUMENTS

| GB | 2206272 A | * | 1/1989 |
| GB | 2280167 A | * | 1/1995 |
| JP | 2007068414 A | * | 3/2007 |

OTHER PUBLICATIONS

Lim et al., Method and Apparatus for the Manufacture of an Expanded Polystyrene Product, Particularly a Pallet, Jan. 25, 1995, GB2280167A, Whole Document.*

(Continued)

*Primary Examiner* — Larry L Furdge
(74) *Attorney, Agent, or Firm* — Doughty Law, L.L.C.; John L. Doughty

(57) ABSTRACT

A molded, carved, stamped, or otherwise manufactured apparatus covers an HVAC register. The apparatus provides an air enhanced lounging place for pets while simultaneously facilitating air-flow from the register to a room it is part of. Reinforcing ribs may provide for the directing of airflow under the apparatus to openings in walls of the apparatus. Electronic circuitry, including sensors, processors, or radios, may detect use by a pet, or even contact by a human, and trigger, or transmit a message to, a user's device such as a smartphone or computer. The circuitry may interoperate with an interactive home monitoring system and trigger the streaming of video from its camera(s) focused on, or in proximity of, the accessory apparatus. An application on a user device may process signals transmitted from the apparatus's circuitry to remotely determine information associated with room environment and/or the pet.

14 Claims, 5 Drawing Sheets

(51) Int. Cl.
*A01K 1/035* (2006.01)
*F24F 120/10* (2018.01)
*F24F 11/56* (2018.01)

(56) References Cited

U.S. PATENT DOCUMENTS

| | | | | |
|---|---|---|---|---|
| 8,131,498 | B1* | 3/2012 | McCauley | A61B 5/1036 |
| | | | | 177/144 |
| 2005/0279286 | A1* | 12/2005 | Youngmark | A01K 1/0353 |
| | | | | 119/28.5 |
| 2006/0011145 | A1* | 1/2006 | Kates | A01K 15/02 |
| | | | | 119/719 |
| 2006/0155172 | A1* | 7/2006 | Rugg | A61B 5/1113 |
| | | | | 600/300 |
| 2008/0022714 | A1* | 1/2008 | Keller | A01K 1/0236 |
| | | | | 62/459 |
| 2008/0022935 | A1* | 1/2008 | Fine | A01K 1/0353 |
| | | | | 119/28.5 |
| 2010/0319627 | A1* | 12/2010 | Cauchy | A01K 1/0236 |
| | | | | 119/500 |

OTHER PUBLICATIONS

Spite, Pet Bed, Jan. 5, 1989, GB2206272A, Whole Document.*
Nakamoto et al., Pet Bed, Mar. 22, 2007, JP2007068414A, Whole Document.*

* cited by examiner

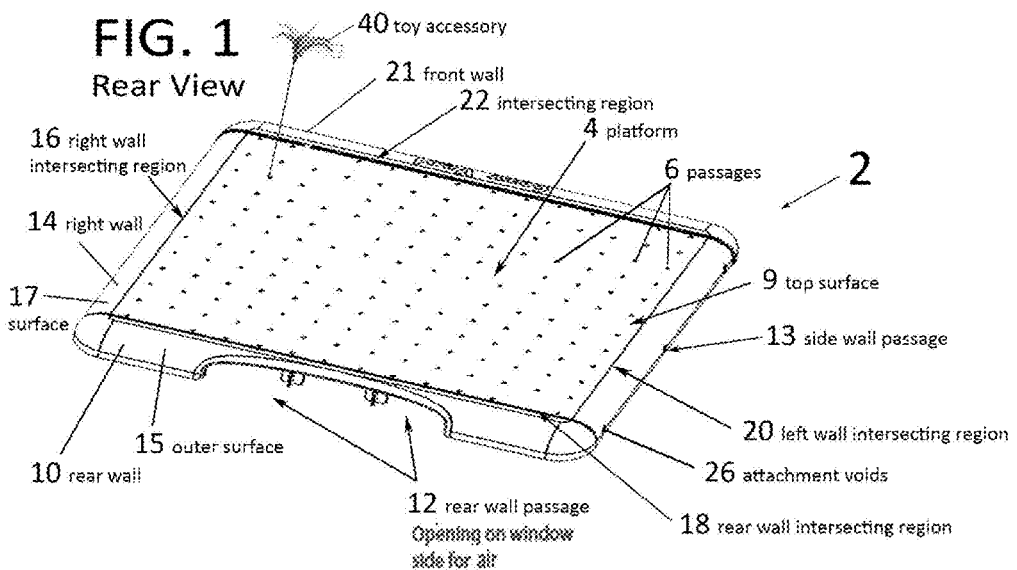
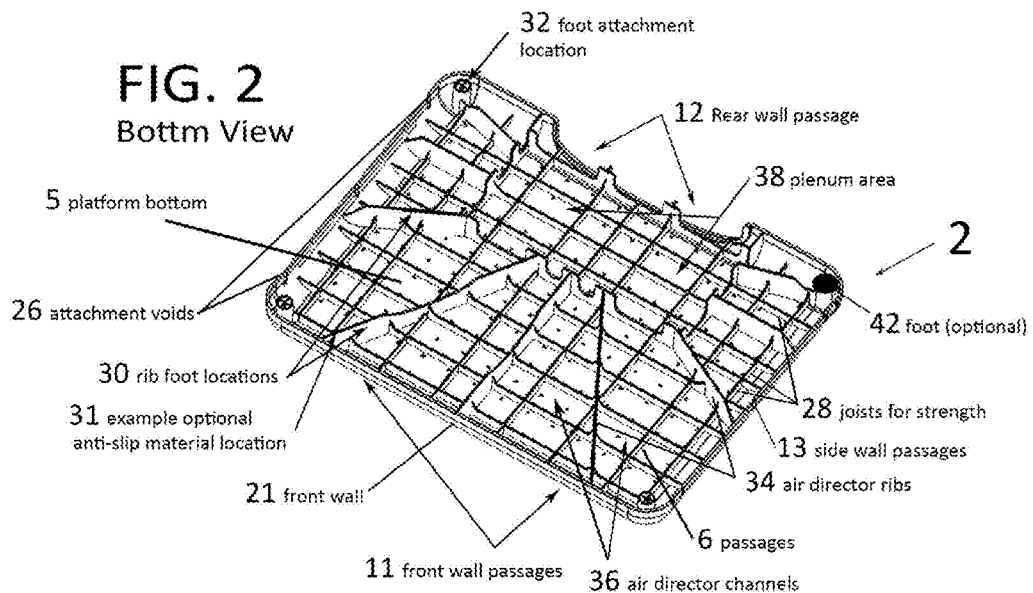

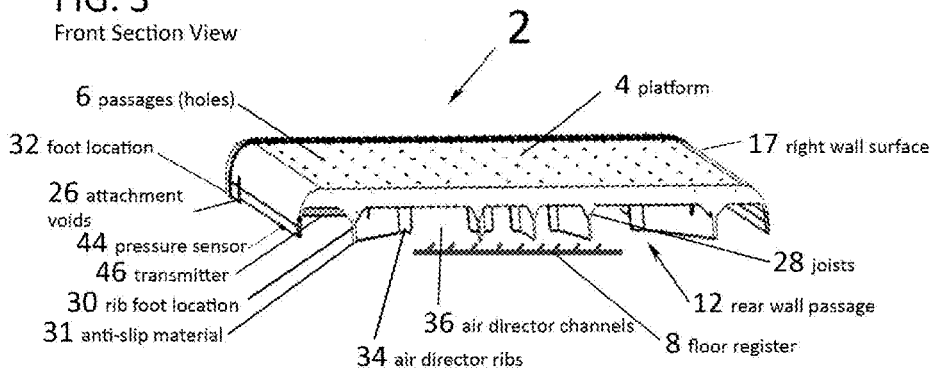
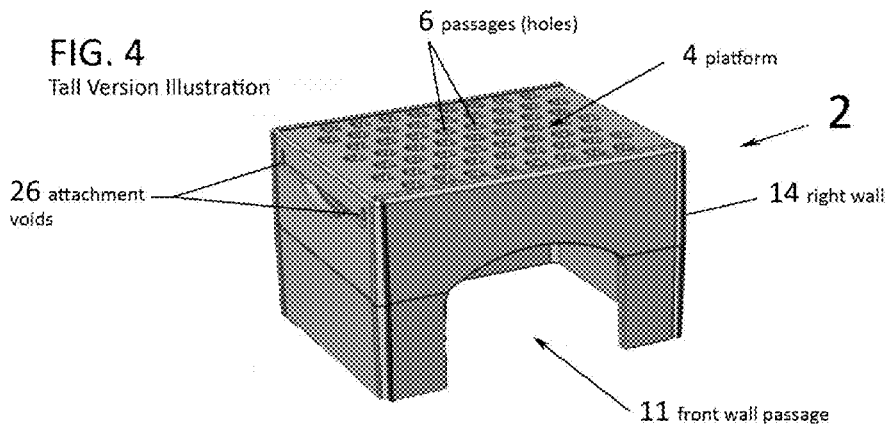
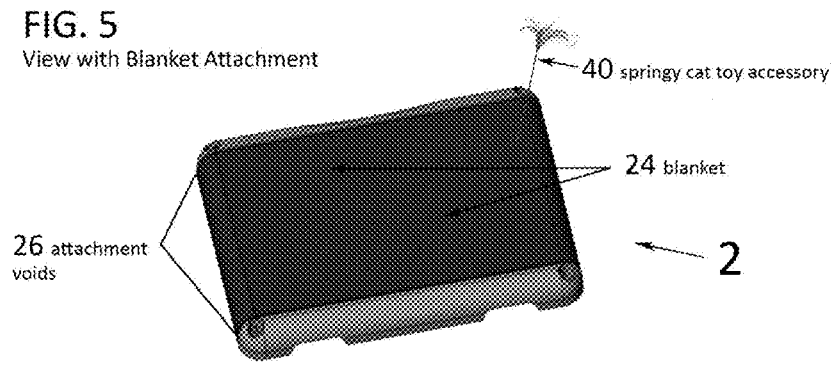

Example Shapes

AIR CONCENTRATOR/DIFFUSER PET ACCESSORY

CROSS REFERENCE TO RELATED APPLICATIONS

Applicant claims priority under 35 U.S.C. § 119(e) to the benefit of the date of provisional patent application entitled "Air concentrator/diffuser pet accessory" having application No. 62/043,319 and filed on Aug. 28, 2014, which this application incorporates by reference in its entirety.

FIELD

The present invention relates to room ventilation and more particularly to a pet accessory that concentrates and directs air to a pet's location.

BRIEF DESCRIPTION OF THE DRAWINGS

FIG. 1 illustrates a concentrator/diffuser for providing an air and temperature-enhanced accessory for a pet.

FIG. 2 illustrates a bottom view of a concentrator/diffuser for providing a temperature-enhanced accessory for a pet.

FIG. 3 illustrates a front sectional view of a concentrator/diffuser for providing an air and temperature-enhancing accessory for a pet.

FIG. 4 illustrates a concentrator/diffuser for providing an air and temperature-enhancing accessory for a pet that is of a higher height than the one in FIG. 1.

FIG. 5 illustrates a view of a concentrator/diffuser pet accessory apparatus with a blanket accessory attached.

DETAILED DESCRIPTION OF THE DRAWINGS

Figure 6:
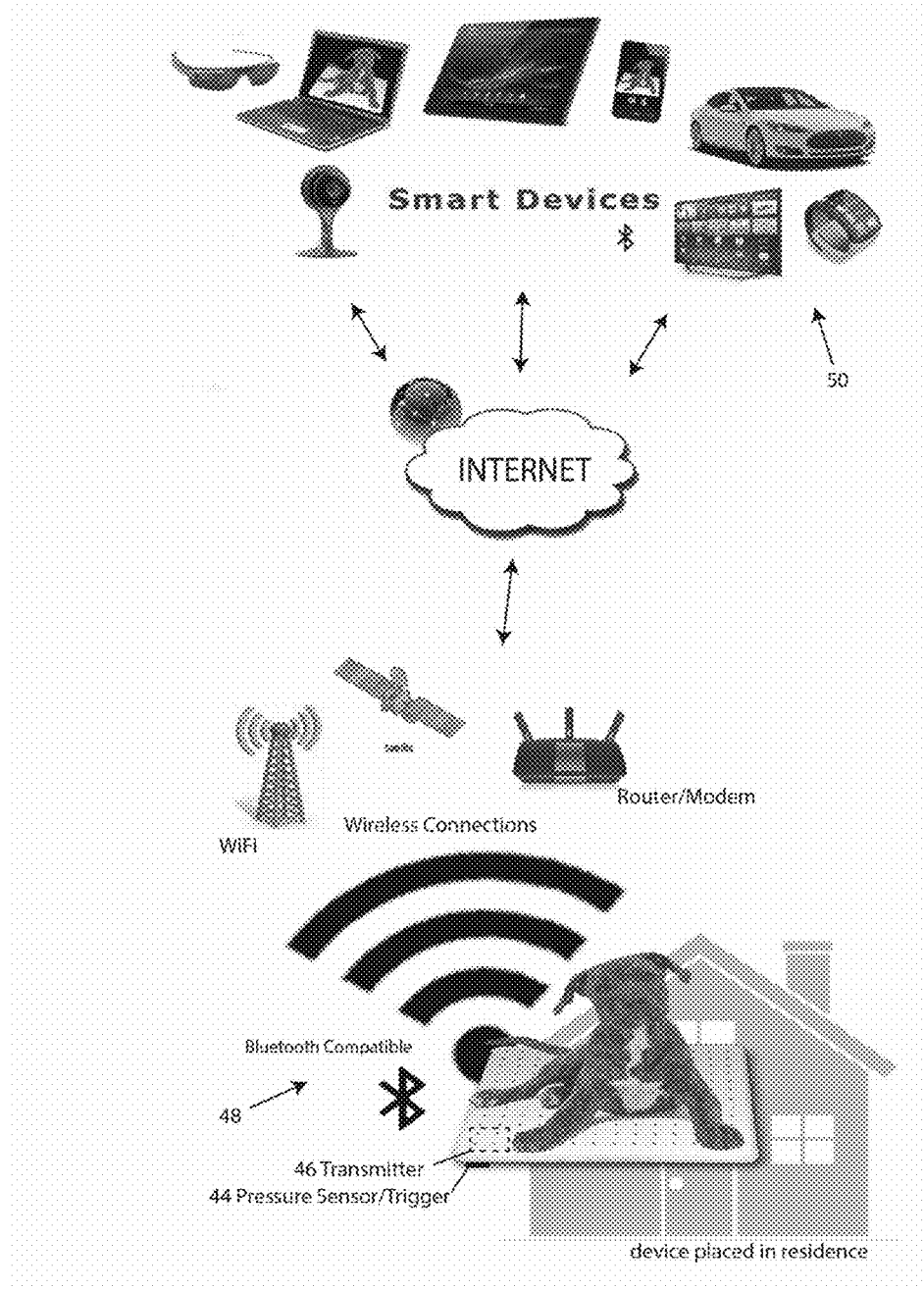
FIG. 6 illustrates a diagram of connectivity possibilities of a concentrator/diffuser pet accessory apparatus to multiple wireless systems.

Turning now to the FIG. 1, the figure illustrates a concentrator/diffuser 2 that includes a platform 4, which defines one or more ventilation through platform passages 6. When the concentrator/diffuser is placed over a room's heating, ventilation, and/or air conditioning ("HVAC") register 8 of a climate control system, through platform passages 6 direct some of the air that discharges from register 8 to reach top surface 9 of platform 4. Concentrator/diffuser may comprise only platform 4.

In another aspect, concentrator/diffuser 2 may also comprise a rear wall 10 with an outer surface 15. Rear wall 10 defines a wall passage 12. Wall passage 12 permits a portion of air discharged from register 8 to flow into the room. Right wall 14 may contain wall passages 13, either exclusively, or rear wall 10 and the right wall may both contain wall passages. Although not shown in FIG. 1, concentrator/diffuser 2 typically includes a front wall 21 at an opposite side from rear wall 10 and also typically includes a left wall at a side of the platform opposite the right wall. Any of the walls may include wall passages 13, either exclusively, or more, or all, of the walls may include wall passages. As shown in FIG. 1, right wall 14 includes outer surface 17. Although not shown in FIG. 1, the front and left walls also have outer surfaces facing away from the platform that the walls join with at respective intersection regions. As shown in FIG. 1, right wall 14 meets (or transitions into) platform 4 at right wall intersection region 16; rear wall 10 intersects the platform at rear wall intersection region 18; the left wall intersects the platform at left wall intersection region 20; and the front wall 21 intersects the platform at front wall intersection region 22. An aspect may be rectangular in shape and will have the walls converge at an inward angle toward the platform surface such that the bottom plane of the walls form a larger perimeter footprint than the area created by the extremities of the platform surface edges. This tapered cuboidal shape aids in both stabilizing the concentrator/diffuser 2 and adds to the comfort of the pet when laying across and/or over the device.

As an alternative embodiment, the transition regions may smoothly and roundedly transition from top surface 9 to outer surfaces of one or more of the walls to provide an unobtrusive transition for a large pet with a large body or with limbs that may sprawl past top surface 9 at any of the transition regions. In this fashioning, the walls may also smoothly transition one to the other, creating a one wall round, oval, or curvature enhanced shape. An example of a curvature enhanced shape would be that of a paw print, house, bone, or other shape that can be effected.

Turning now to FIG. 2, the figure illustrates a bottom view of a concentrator/diffuser 2 that includes a platform bottom surface 5, which defines one or more ventilation through platform passages 6. Surface 5 may have any number and shape of joists 28 which tend to minimize flexing or cracking of the device 2 under the anticipated weight of a pet or other article placed on the device when in use. It is beneficial to proper air flow that air passages 6 be numerous. Joists 28 are placed in locations void of holes/passages 6, thereby the two features work in concert to assure the platform 4 is strong enough to support the live load of a pet or other object as intended. In anticipation of further stabilizing the device when in use, a method of creating anti-slip points of contact with the floor/surface on which the device is placed are advantageous. Any number of rib foot locations 30 may span any length of and on any portion of any number of air director ribs 34, whereas the rib foot locations are of the same elevation as the lowest horizontal plane of the device/apparatus. When anti-slip material 31, such as rubber u-channel, is attached to the rib foot location 30, the anti-slip material, by virtue of its thickness, will contact the floor surface instead of other portions of the device that would otherwise contact the floor surface, thereby affecting the anti-slip action. In another aspect, foot attachment locations 32 can be added to the platform bottom surface 5, in anticipation of attaching third party feet, such as screw or push-on feet, rubber pads, or the like. In another aspect, the feet may be made so that the ribs are slightly elevated so that a bottom edge of the one or more of the ribs do not align with a bottom of the feet. In another aspect, any number of feet 42 may be integrated to the concentrator/diffuser device/apparatus 2 such that they protrude just beyond the bottom plane of the device. (Edges of ribs 34 distal from edges that meet, or are integrated with, top surface 9 at bottom surface 5, may define the bottom plane of the device.) These integral feet 42 may readily accept anti-slip material in, on, or around them to aid in keeping the concentrator/diffuser 2 stable on a floor surface during use; feet 42 themselves may be made from an anti-slip material.

When concentrator/diffuser 2 is placed over a room's heating, ventilation, and/or air conditioning system (HVAC) register, and the system's air handler is actively pushing air through the floor register into the conditioned space of the room, the concentrator/diffuser directs the air flow from the register across the surface area of platform bottom 5 by means of air director ribs 34 and air director channels 36. Preferably, a human user may place device 2 over the existing floor register 8 such that the register aligns within the bounds of the plenum area 38, which is preferably devoid of air director ribs 34, or at least devoid of ribs that extend from substantially the plane of the floor to bottom surface 5, to provide clearance for any vertical protrusions of the existing register above the horizontal plane of the finished floor surface of the conditioned space. Plenum area 38 also provides an open, air volume space that may concentrate air at the back of the device such that it effects a flow of air out the back of the device through air passage 12 into the room, thereby assuring the device does not significantly impede the conditioning of the room air, even when in use by a pet blocking air flow through passages 6. As air moves from the register into the plenum, a portion of air is then also directed by the air director ribs 34 into air director channels 36. The channels 36 are further defined as those volumes of space between ribs 34. The resulting air volume in, out, through, and between channels facilitates even air flow toward ventilation passages 6 and wall passages 11, 12, and, 13, even though some may be of a greater distance from the air source floor register than others. This directing of air is important not only to provide even temperature changing across platform surface 5 for the intended primary use of the device of providing comfort to a pet, but also to facilitate airflow into the conditioned room space for the purpose of conditioning the room, and thus not remain blocked under/by the device and a pet using it. Air director ribs 34 may be of any number and height (i.e., extent from surface 5 toward a floor or register surface), so long as their height, or extent from surface 5, exceeds the height of the joists 28 (i.e., the ribs extend farther from surface 5 than do joists 28). Ribs 34 may be of any shape, surface area, contain holes/voids, be solid, be arched, or other shapes, and can affect additional support and strengthening of the device in conjunction with joists 28.

Turning now to FIG. 3, the figure illustrates a front sectional view of a concentrator/diffuser 2 that includes a platform 4, which defines one or more ventilation paths for ventilation through platform passages 6 and wall passages 12, joists 28, foot ribs 30, anti-slip material 31, optional foot attachment locations 32, air director ribs 34, and air channels 36. Through-platform-passages 6 serve an additional function as a connection location for optional pet toys and accessories. One such embodiment of an example accessory attachment 40 is a springy cat batting toy (shown in FIGS. 5 and 8). It can be envisioned that an infinite number of accessories can be created to attach to the device through, in or on the passages 6, including, but not limited to, pet toys, feeding dishes, bedding, grooming, teething, scratching, monitors, gauges, décor, measuring and other informational, educational, or enjoyment devices, etc.

Turning now to FIG. 4, the figure illustrates a taller embodiment of a concentrator/diffuser 2 that includes a platform 4, which defines one or more ventilation through platform passages 6 and wall passages 11, 12, and 13 (passages 12 and 13 are shown in FIG. 2). The figure is presented as an example of the ability of the device to have different shapes and sizes by way of increasing, decreasing or changing the dimensions of the components, in this case the walls are shown with an increased height. This embodiment is anticipated as a cat-friendly version of the device, and may be used on its own, or in addition to (on, around, or over) a platform version of the device to create a cubby/pet-house area underneath for a pet to retreat into. In this taller embodiment, front wall passage 11 would be enlarged to be sizable enough for the pet to comfortably enter and egress underneath the bottom surface 5 of device 2. Rear and side wall passages 12 and 13, shown in FIG. 2, may stay smaller than a front passage to help maintain a volume of temperature enhanced air under the device, while still directing air into the room as needed. In this embodiment, it can be foreseen that air director channels may be eliminated or change in height, remaining at depths closer to the platform surface, thereby not reaching the horizontal floor plane.

Turning now to FIG. 5, illustrates an optionally used auxiliary accessory, a blanket 24 which may be placed on and/or around the device platform and/or walls as a means of increasing the comfort of the user, namely a pet. Blanket 24 may be made from any material that allows air to pass through platform passages 6 to blanket 24, causing a temperature change in blanket 24, which then may transfer through touch to a pet or other object positioned on the platform. Material examples are those such as knit or spun cloth, like fleece, cotton or flannel, mesh fabric, loose weave material, carpeting, or any conductive material, even solid non-weaved, through which temperature change is readily affected, or solid material in which a hole pattern matching that of the passage 6 pattern on the platform is affected. The blanket may be simply placed on the device, or attached to, over, or around the device in some method of stabilization to affect holding the blanket on the device. To retain blanket 24, one or more of the transition intersecting regions and/or walls may have attachment voids 26. These voids, slits, or teeth like shapes cut into the housing may be in any location and number on the walls, transition regions, and platform as needed to affect the blanket material attachment by means of wrapping around, through, into, or over the voids and/or teeth/projections between voids. Other means of attachment of blanket 24 may be fasteners, such as, for example, VELCRO® may be affixed to top surface 9, bottom surface 5, or one or more locations on one or more of the transition regions or walls. It can be foreseen that an abundance of methods of attachment of a blanket to the device may be envisioned, with a few of the listed examples being things just as Velcro, snaps, pins, string, elastic, hooks, buttons, indentions, teeth, screws, bolts, clips, magnets, and the like. Blanket 24 may also be affective without any attachments by mean of simply being placed on top of the device platform.

Turning now to FIG. 6, the figure illustrates a wireless communication diagram of various ways in which the pet accessory can send and receive information to the user. The accessory can include a pressure sensor or a sensor 44 that may trigger a processor 46 that is part of, or coupled with the sensors of the concentrator/diffuser device/accessory to send wireless communication signals to a device over a wireless link for delivery to a user (i.e., a pet's owner) via a user device. The wireless link may be a short range wireless communication protocol 48 such as Wi-Fi, Bluetooth, or any IEEE 802.11 protocol. In an aspect, sensor 44 may be integral with ribs 34, or feet attached thereto at locations 30 (shown in FIG. 2), or may even substitute for one or more feet attached to the ribs. The information transmitted via the wireless signal from the concentrator/diffuser pet accessory apparatus/device may include any number of conceivable features that the user may wish to learn about their pet, the device, the vicinity surrounding the device, such as, but not limited to a pet's use of the device (pressure on the device), vital signs of the pet, such as pulse rate, temperature on or near the device, humidity levels, air quality, weight, motion, air pressure, etc., using sensors 44 that are designed to generate signals corresponding to one or more of these parameters, or other environment or presence parameters. Signals including such data may activate, or trigger, operation of other electronic devices 50 installed near, or coupled with, the pet accessory. Such other electronic devices, as well as the user device, or devices for receiving information from the signals transmitted from processor 46, may include smart phones, tablets, computers, personal communication devices, interactive home systems, security cameras—both wired and wireless, video, two-way communication (audio or video), toys, and other interactive or monitoring processes or devices, including the aforementioned sensors or accelerometers, acoustic transducers, and the like. The apparatus/pet accessory may also include one or more microphones, or one or more speakers, to facilitate remote audio communication between the pet and a pet's owner via a user device of the owner, or to facilitate audio communication with people in the room that contains the pet accessory.

Figure 7:
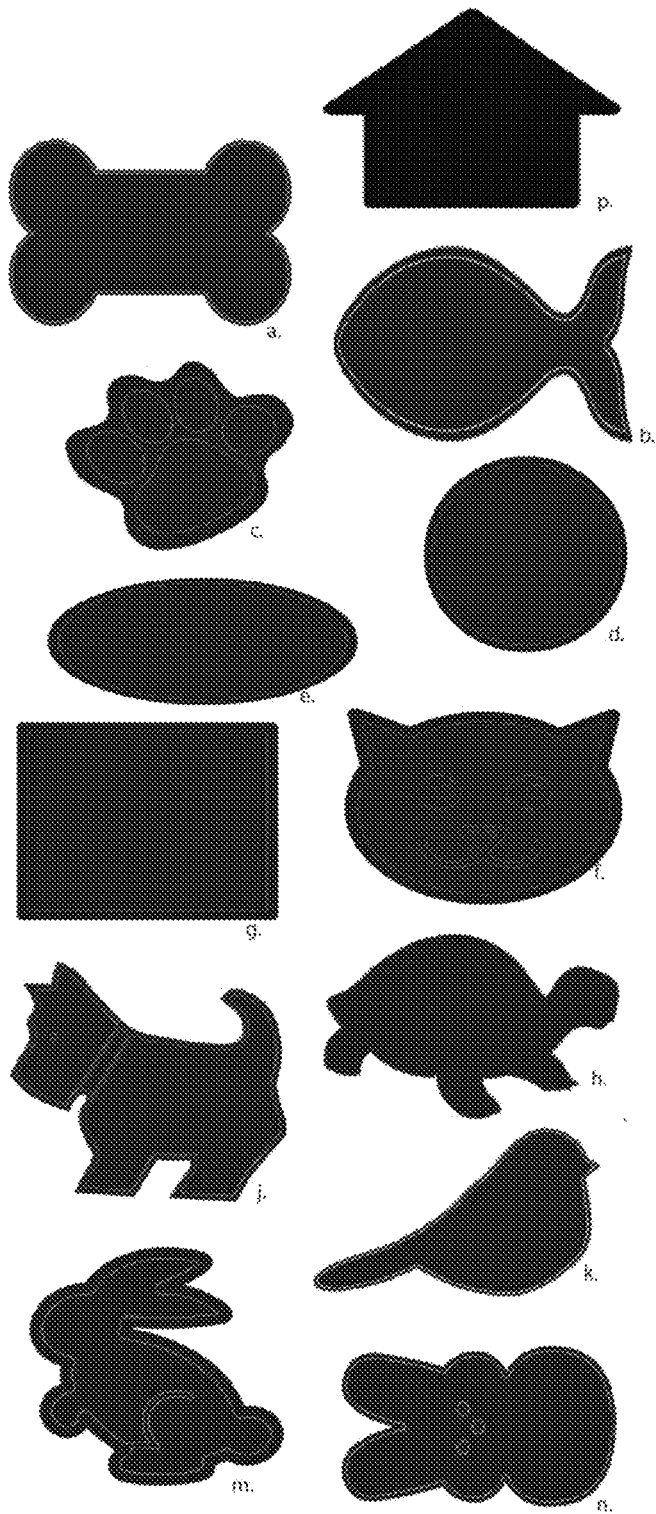
FIG. 7 illustrates examples of optional shapes of a concentrator/diffuser pet accessory apparatus.

Turning now to FIG. 7, the figure illustrates examples of general shapes that the concentrator/diffuser pet accessory may take. It is conceivable that an infinite number of shapes may be imagined for the device, which, by way of having walls and a platform with holes, may be suitable for affecting the desired use of the device. A few examples of shapes are illustrated as a bone (a), a fish (b), a paw print (c), a circle (d), an oval (e), a cat (f), a rectangle (g), a turtle (h), a dog (j), a bird (k), a rabbit (m), a commercial character (n), a house (p), and other geometric shapes not shown such as a square, rhombus, trapezoid, pentagon, parallelogram, octagon, triangle, or combination of any or all of these to affect a desired final shape. It may also be envisioned that the surface of the device, platform 4, may be of a shape other than flat, such as concave, convex, eggcrate, multi-conical, or other singular or multi-level shaping as desired to enhance the pet's experience.

Figure 8:
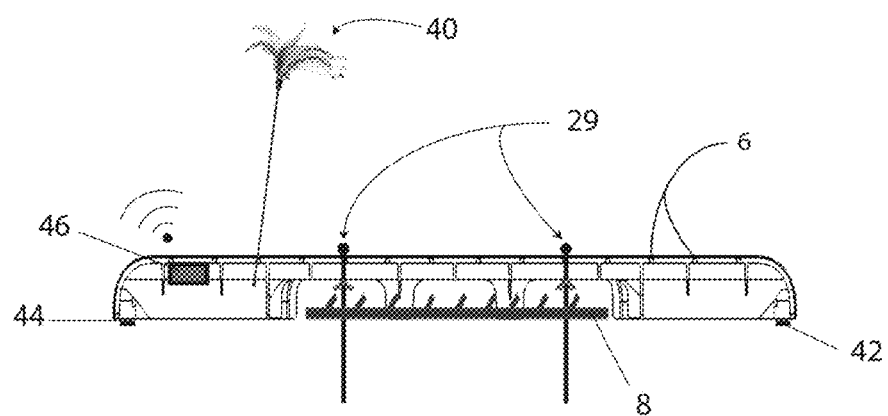
FIG. 8 illustrates examples of auxiliary accessories for use with a concentrator/diffuser pet accessory apparatus.

Turning now to FIG. 8, the figure illustrates examples of a variety of attachable accessories that may be affixed to the device utilizing hole passages 6 as a connection point. Any number of, shapes, purposes, and connection points for accessories can be achieved for the enjoyment and/or care, comfort, or service for the pet. One such embodiment of an example accessory attachment 40 is a springy cat batting toy. An infinite number of accessories can be created to attach to the device through, in or on the passages 6, including, but not limited to, pet toys, feeding dishes, bedding, grooming, teething, scratching, monitors, gauges, décor, measuring and other informational, educational, or enjoyment devices, etc. Another accessory that may aid in maintaining the location of the device over the room's heating, ventilation and/or air conditioning (HVAC) register is a stabilizer post 29, which may be attached to the platform. When one or more stabilizer posts 29 are placed through the platform passages 6, the size of them are preferably selected so that they are long enough to pass by the horizontal plane of the floor, and terminate inside the cavity in the floor, wherein the air duct opening typically defines the cavity. When forces push the device sideways along the floor, the stabilizer posts make contact with the sides of the floor opening and stop the device from shifting horizontally (i.e., parallel to the plane of the floor).

While preferred embodiments of concentrator/diffuser pet accessory have been described in detail, it should be apparent that modifications and variations thereto are possible, all of which fall within the true spirit and scope of the invention. Thus, all equivalent relationships and aspects similar to those illustrated in the drawings and described in this specification are contemplated thereby.

It will be appreciated that the invention described herein is susceptible to variations and modifications other than those specifically described. The invention includes all such variations and modifications that fall within its spirit and scope. Therefore, the foregoing is considered as illustrative of the principles of the invention and all suitable modifications and equivalents may be resorted to, and presumed as falling within the scope of the invention.

What is claimed is:

1. A concentrator and/or diffuser, comprising:
    a platform having a bottom surface and a top surface;
    a front wall connected to the platform at an intersection region of the front wall and the platform;
    wherein the platform defines one or more through passages from the bottom surface to the top surface for permitting air discharged from a floor ventilation system opening to pass from the bottom surface to the top surface;
    wherein the platform includes strengthening joists on the bottom surface;
    wherein ribs couple with the bottom surface and are located to direct air flowing from the floor ventilation system opening toward the bottom surface to openings defined by the front wall; and
    wherein feet are attached to the ribs.

2. The concentrator and/or diffuser of claim 1 further comprising:
    a rear wall connected to the platform at an intersection region of the rear wall and the platform, wherein the rear wall has an inside surface and an outside surface;
    a right wall connected to the platform at an intersection region of the right wall and the platform; and
    a left wall connected to the platform at an intersection region of the left wall and the platform.

3. The concentrator and/or diffuser of claim 1 wherein at least one of the feet is a sensor for detecting one or more of environmental parameters or vital signs of a pet lying on the top surface.

4. The concentrator and/or diffuser of claim 3 wherein the sensor is an accelerometer.

5. The concentrator and/or diffuser of claim 3 wherein the sensor is a strain gage.

6. The concentrator and/or diffuser of claim 3 further comprising a processor coupled with the at least one of the feet that is a sensor, wherein the processor is to acquire one or more signals from the at least one of the feet that is a sensor and transmit the one or more signals, or transmit a processed form of the one or more signals, to a receiving device, wherein the receiving device receives the transmitted signals over a wireless link.

7. A concentrator and/or diffuser, comprising:
    a platform having a bottom surface and a top surface;
    a front wall connected to the platform at an intersection region of the front wall and the platform;
    a rear wall connected to the platform at an intersection region of the rear wall and the platform, wherein the rear wall has an inside surface and an outside surface;
    a right wall connected to the platform at an intersection region of the right wall and the platform;
    a left wall connected to the platform at an intersection region of the left wall and the platform; and
    wherein the platform defines one or more through passages from the bottom surface to the top surface for permitting air discharged from a floor ventilation system opening to pass from the bottom surface to the top surface;

wherein the platform includes strengthening joists on the bottom surface;
wherein the platform defines one or more air director ribs in a predefined region of the platform; and
wherein feet are attached to the ribs.

8. The concentrator and/or diffuser of claim 7 wherein the rear wall defines one or more wall passages to permit air discharged from the floor ventilation system to pass from the inside surface of the rear wall to the outside surface of the rear wall.

9. The concentrator and/or diffuser of claim 7 wherein the right wall defines one or more wall passages to permit air discharged from the floor ventilation system to pass from the inside surface of the right wall to the outside surface of the right wall.

10. The concentrator and/or diffuser of claim 7 wherein the platform further defines a plenum that directs air from the floor ventilation system opening to the predefined region of the platform having the one or more air director ribs.

11. The concentrator and/or diffuser of claim 7 wherein the platform further defines a plenum that directs air from the floor ventilation system opening to the air director ribs.

12. The concentrator and/or diffuser of claim 7 wherein the platform further defines a plenum that cooperates with the air director ribs that form channels to direct air from the floor ventilation system opening to one or more wall passages.

13. A method, including:
generating one or more signals from one or more sensors;
transmitting the one or more signals via a processor;
wherein a concentrator and/or diffuser includes:
the one or more sensors, wherein the one or more sensors is coupled to the processor;
the processor, and
a platform having a bottom surface and a top surface;
a front wall connected to the platform at an intersection region of the front wall and the platform; and
wherein the platform defines one or more through passages from the bottom surface to the top surface for permitting air discharged from a floor ventilation system opening to pass from the bottom surface to the top surface;
ribs for directing air presented to the bottom surface to an opening defined by the front wall;
wherein the processor is to transmit the one or more signals via a short-range wireless link to a device for providing information to a user via a user device; and
wherein the one or more sensors are coupled to an edge of one or more of the ribs wherein the edge to which the one or more sensors are coupled is a distal edge of the one more ribs with respect the bottom surface.

14. The method of claim 13 wherein the one or more sensors is a temperature sensor and wherein the processor is to transmit a signal representing a temperature detected by the sensor to a thermostat that is associated with a climate control system associated with the floor ventilation system.

* * * * *